United States Patent
Cahill et al.

(10) Patent No.: US 10,356,016 B2
(45) Date of Patent: Jul. 16, 2019

(54) SYSTEM AND METHOD FOR PSEUDO-PRESENCE INDICATION FOR NON-XMPP CLIENT DEVICES WITHIN XMPP APPLICATIONS

(71) Applicant: Webtext Holdings Limited, Dublin (IE)

(72) Inventors: AJ Cahill, Galway (IE); Colm Keating, Dublin (IE)

(73) Assignee: WEBTEXT HOLDINGS LIMITED, Dublin (IE)

( * ) Notice: Subject to any disclaimer, the term of this patent is extended or adjusted under 35 U.S.C. 154(b) by 675 days.

(21) Appl. No.: 14/562,667

(22) Filed: Dec. 6, 2014

(65) Prior Publication Data
US 2015/0163177 A1     Jun. 11, 2015

Related U.S. Application Data

(60) Provisional application No. 61/912,735, filed on Dec. 6, 2013.

(51) Int. Cl.
*H04L 12/58* (2006.01)
*H04L 29/06* (2006.01)

(52) U.S. Cl.
CPC ............ *H04L 51/04* (2013.01); *H04L 51/043* (2013.01); *H04L 51/28* (2013.01); *H04L 67/42* (2013.01)

(58) Field of Classification Search
CPC ....... H04L 51/04; H04L 51/043; H04L 51/28; H04L 67/42; H04W 4/02; H04W 4/12
See application file for complete search history.

(56) References Cited

U.S. PATENT DOCUMENTS

| 7,142,856 | B2 * | 11/2006 | Barrow | H04W 8/20 455/403 |
| 7,412,231 | B1 * | 8/2008 | Kelleher | H04L 51/38 455/412.1 |
| 9,374,328 | B1 * | 6/2016 | Kempen | H04L 51/043 |
| 2004/0078445 | A1 * | 4/2004 | Malik | G06Q 10/107 709/206 |
| 2004/0219908 | A1 * | 11/2004 | Ganor | H04W 88/184 455/422.1 |
| 2006/0116139 | A1 * | 6/2006 | Appelman | H04L 12/581 455/466 |

(Continued)

FOREIGN PATENT DOCUMENTS

| EP | 2160051 A1 | 3/2010 |
| WO | 2012079649 A1 | 6/2012 |

OTHER PUBLICATIONS

International Preliminary Report on Patentability, Application No. PCT/IB2014/066665, dated Jun. 7, 2016, 7 pages.

*Primary Examiner* — Tonia L Dollinger
*Assistant Examiner* — Kristoffer L S Sayoc
(74) *Attorney, Agent, or Firm* — Pearne & Gordon LLP

(57) ABSTRACT

A method includes receiving a message from an XMPP client for delivery to a contact, querying an XMPP presence system for an XMPP address and presence information related to the contact, querying the XMPP presence system for an alternative address if an XMPP address is not available or the presence information indicates that the contact is unavailable, and delivering the message to the alternative address or storing the message for future delivery if an alternate address is unavailable.

28 Claims, 4 Drawing Sheets

(56) References Cited

U.S. PATENT DOCUMENTS

| | | | |
|---|---|---|---|
| 2008/0132259 A1* | 6/2008 | Vin | H04L 51/04 455/466 |
| 2009/0041217 A1* | 2/2009 | Balk | H04L 51/34 379/93.01 |
| 2010/0135278 A1 | 6/2010 | Dingler et al. | |
| 2012/0117166 A1* | 5/2012 | Sharma | H04L 51/046 709/206 |
| 2014/0089404 A1* | 3/2014 | Sanches | H04L 41/026 709/204 |

* cited by examiner

SYSTEM AND METHOD FOR PSEUDO-PRESENCE INDICATION FOR NON-XMPP CLIENT DEVICES WITHIN XMPP APPLICATIONS

CROSS-REFERENCE TO RELATED APPLICATIONS

This application claims the benefit of U.S. Provisional Application No. 61/912,735, filed on 6 Dec. 2013, which is incorporated herein by reference in its entirety.

BACKGROUND

Extensible Messaging and Presence Protocol (XMPP) is an Extensible Markup Language (XML) based communications protocol used for various applications including instant messaging, presence indication, and file transfer. XML streams are used to exchange structured information between XMPP entities. An initial stream may be negotiated between parties and enables unidirectional communication from a first party to a second party. A separate response stream must be negotiated between the second party and the first party in order to enable communication in the opposite direction. Upon completion of negotiations, the party initiating the stream may then send a number of XML stanzas. There are different kinds of stanzas including: message (<message/>), presence (<presence/>), and IQ (<iq/>, short for "Info/Query"). These stanza types provide three different communication primitives: a "push" mechanism for generalized messaging, a specialized "publish-subscribe" mechanism for broadcasting information about network availability, and a "request-response" mechanism for more structured exchanges of data. Reference is made to Saint-Andre, P., "Extensible Messaging and Presence Protocol (XMPP): Instant Messaging and Presence", RFC 6121, March 2011, incorporated by reference.

At least one problem arises from the fact that a sender must manually re-route messages to other addresses for a contact if that contact's XMPP address is not available to receive messages. Other problems arise from the fact that, while it is possible to exchange messages between XMPP and non-XMPP parties, there is no current way for an XMPP client application to ascertain the validity of, and likely availability of, a non-XMPP based (e.g.: Short Message Service (SMS), Unstructured Supplementary Service Data (USSD), or Voice) consumer of that application's messages.

SUMMARY

The disclosed embodiments provide for automatic routing of messages to a non-XMPP device for a contact if an XMPP device address for that contact is unavailable. In addition, the disclosed embodiments provide the ability to send messages between XMPP and non-XMPP devices with the additional feature of providing presence or 'pseudo presence' information to the sending device, in a format that any existing XMPP application can interpret without modification.

In at least one embodiment, a method includes receiving a message from an XMPP client for delivery to a contact, querying an XMPP presence system for an XMPP address and presence information related to the contact, querying the XMPP presence system for an alternative address if an XMPP address is not available or the presence information indicates that the contact is unavailable, and delivering the message to the alternative address or storing the message for future delivery if an alternate address is unavailable.

In an aspect of the disclosed embodiments, the method may also include querying a virtual roster of the XMPP presence system for the XMPP address, presence information, and the alternative address.

In another aspect of the disclosed embodiments, the method may also include sending the message to the XMPP address if the XMPP address is available and the XMPP presence information indicates that the contact is available.

In another aspect of the disclosed embodiments, querying the XMPP presence system for presence information for the contact may include querying components of the XMPP presence system for a presence indication related to the contact that meets certain time constraints, querying components of a telecommunications system in which the XMPP presence system resides for a presence indication related to the contact if the XMPP presence system query fails, assigning a default presence indication if the telecommunications system query fails, and sending the presence indication to the XMPP client.

In another aspect of the disclosed embodiments, querying components of the XMPP presence system for a presence indication related to the contact that meets certain time constraints includes querying a virtual roster of the XMPP presence system for a presence status that was set within a certain time, and querying a messaging engine for delivery status of messages sent to the contact that meet a time threshold if the virtual roster query fails.

In another aspect of the disclosed embodiments, querying components of a telecommunications system in which the XMPP presence system resides for a presence indication related to the contact includes querying a home location register for a status of the contact, and sending a non-XMPP message to the contact if the home location register query fails.

In one or more embodiments, an apparatus includes a memory with computer readable program code and a processor, wherein the processor with the memory and computer readable program code are configured to cause the apparatus to receive a message from an XMPP client for delivery to a contact, query an XMPP presence system for an XMPP address and presence information related to the contact, query the XMPP presence system for an alternative address if an XMPP address is not available or the presence information indicates that the contact is unavailable, and deliver the message to the alternative address or storing the message for future delivery if an alternate address is unavailable.

In at least one aspect of the disclosed embodiments, the processor with the memory and computer readable program code are further configured to cause the apparatus to query a virtual roster of the XMPP presence system for the XMPP address, presence information, and the alternative address.

In another aspect of the disclosed embodiments, the processor with the memory and computer readable program code are further configured to cause the apparatus to send the message to the XMPP address if the XMPP address is available and the XMPP presence information indicates that the contact is available.

In another aspect of the disclosed embodiments, the processor with the memory and computer readable program code are further configured to cause the apparatus to query the XMPP presence system for presence information for the contact by querying components of the XMPP presence system for a presence indication related to the contact that meets certain time constraints, querying components of a telecommunications system in which the XMPP presence system resides for a presence indication related to the contact if the XMPP presence system query fails, assigning a default presence indication if the telecommunications system query fails, and sending the presence indication to the XMPP client.

In another aspect of the disclosed embodiments, the processor with the memory and computer readable program code are further configured to cause the apparatus to query components of the XMPP presence system for a presence indication related to the contact that meets certain time constraints by querying a virtual roster of the XMPP presence system for a presence status that was set within a certain time, and querying a messaging engine for delivery status of messages sent to the contact that meet a time threshold if the virtual roster query fails.

In another aspect of the disclosed embodiments, the processor with the memory and computer readable program code are further configured to cause the apparatus to query components of a telecommunications system in which the XMPP presence system resides for a presence indication related to the contact by querying a home location register for a status of the contact, and sending a non-XMPP message to the contact if the home location register query fails.

In at least one other embodiment, an XMPP presence system includes an XMPP gateway configured for receiving a message from an XMPP client for delivery to a contact, a messaging engine configured to query a virtual roster for an XMPP address and presence information related to the contact, the messaging engine further configured to query the virtual roster for an alternative address if an XMPP address is not available or the presence information indicates that the contact is unavailable, and a stanza router configured to deliver the message to the alternative address.

In at least one aspect of the disclosed embodiments, the XMPP gateway is configured to send the message to the XMPP address if the XMPP address is available and the XMPP presence information indicates that the contact is available.

In another aspect of the disclosed embodiments, the messaging engine is configured to query the virtual roster for a presence indication related to the contact that meets certain time constraints, the system further comprising a rostering engine configured to query components of a telecommunications system in which the XMPP presence system resides for a presence indication related to the contact if the XMPP presence system query fails;

In another aspect of the disclosed embodiments, the rostering engine is configured to query a home location register for a status of the contact.

In another aspect of the disclosed embodiments, the apparatus includes a pinger configured to establish an internet protocol session with the contact if the home location register query fails.

DETAILED DESCRIPTION

Information is harvested from a number of sources to allow the disclosed embodiments to collect, deduce or extrapolate presence information for a particular client device, address or number. Queries are made which examine the Home Location Register (HLR) status of the number in the case of a cell/landline number. A procedure is employed to deduce the likely availability of a number based on recent activity around delivery of Mobile Originated/Mobile Terminated (MO/MT) messages, delivery receipts, HLR status and additional methods. Once the availability is determined, it is made available as an XMPP presence stanza to the interested client application.

Functional Components

Figure 1:
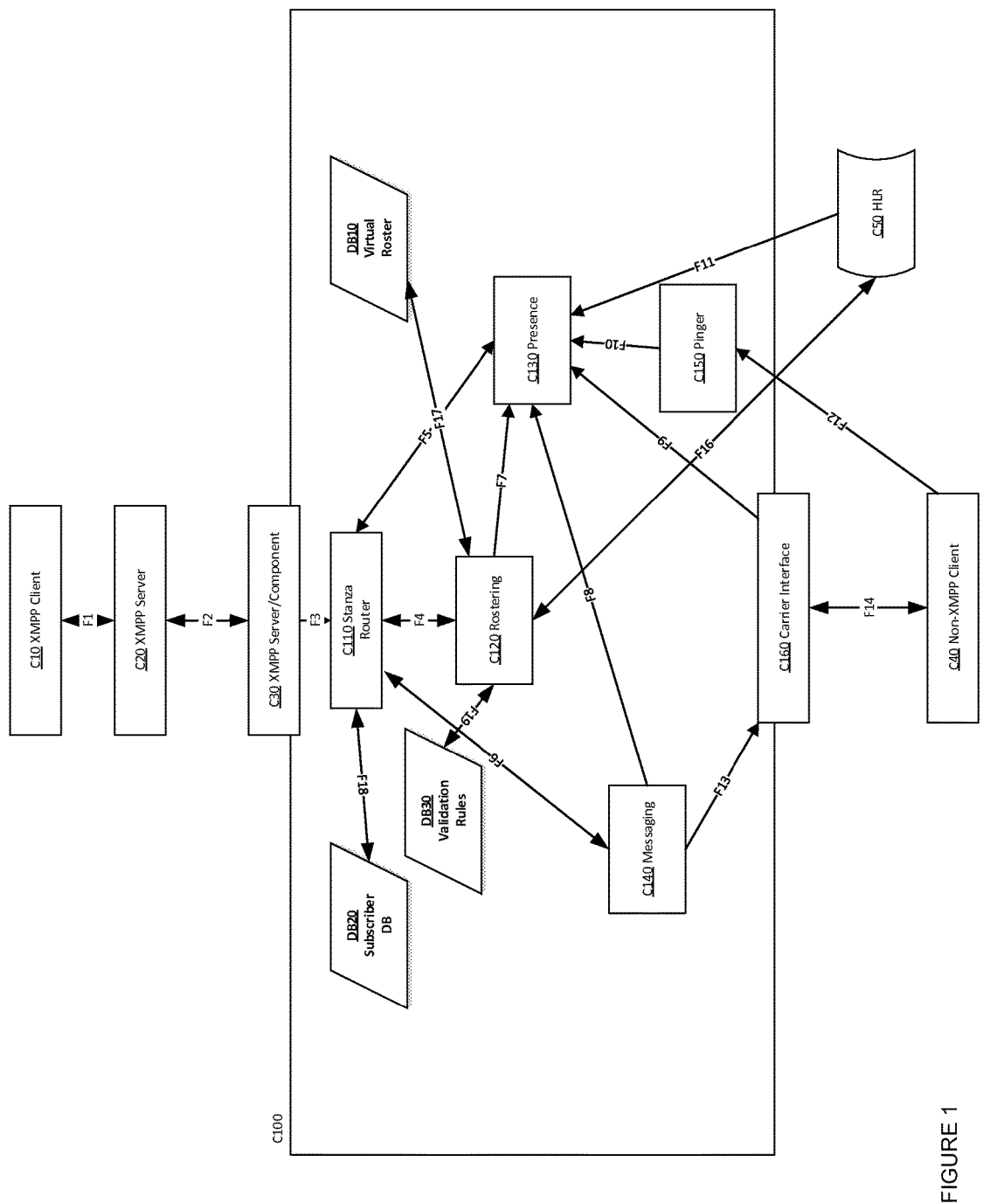
FIG. 1. A representation of the system and method of the disclosed embodiments.

Referring to FIG. 1, an XMPP Client C10, implemented for example, as a desktop client (e.g.: Webex Connect, Pidgin) or an application library (e.g.: Perl Net::XMPP, C++, Java XMPP Library) may connect via XMPP protocol (F1) to an XMPP Server C20, (eg: Cisco Jabber, Openfire, ejabberd). A federated XMPP connection (F2) between the XMPP server C20 and XMPP gateway component C30 allows the trusted exchange of traffic between the XMPP client C10 and system C100 of the disclosed embodiments. XMPP gateway component C30 presents as an XMPP 'component' (Ref: XEP-0114: Jabber Component Protocol), which allows it to directly handle and parse all incoming and outgoing XMPP stanzas to/from system C100. XMPP gateway component C30 passes stanzas received over Internet Protocol (IP) into system C100. Traffic, in the form of XMPP stanzas, exiting system C100 is passed from XMPP gateway component C30 to XMPP server C20, and when required, on to XMPP client C10.

A stanza router C110 receives inbound XMPP messages (stanzas) from XMPP gateway component C30, parses them and routes them to rostering engine C120, presence engine C130, or messaging engine C140 as appropriate. Rostering requests (eg: <presence/> stanzas of types "subscribe, unsubscribe, subscribed, unsubscribed" and others) are passed over IP to rostering engine C120. Other <presence/> stanzas are passed via IP (F5) to presence engine C130. Messaging stanzas (<message/>) are passed via IP over F6 to messaging engine C140. An Application Program Interface (API) (not shown), presented over Hypertext Transfer Protocol (HTTP), allows other components within system C100, or outside, to inject XMPP stanzas into the XMPP environment. API calls provided include, amongst others, 'send_subscribed', 'send_probe' and 'send_unsubscribed'.

The rostering engine C120 takes input from stanza router C110, in the form of requests to subscribe, unsubscribe and other rostering activities. Stanza router C110 outputs include, but are not limited to, an INSERT or UPDATE to the hosted Virtual Roster DB10 over IP flow F17. Stanza router C110 may also provide output to presence engine C130 (F7) where the rostering activity has necessitated a presence event. Input to rostering engine C120 will also come from presence engine C130 when a presence change needs to be flagged in virtual roster DB10.

Presence engine C130 handles presence updates by passing them over F7 to rostering engine C120, thus indirectly updating virtual roster DB10 to flag the stanza originator as having the availability status provided by the inbound <presence/> stanza. Virtual roster DB10 stores availability status for both XMPP and non-XMPP contacts. Presence engine C130 also determines presence status upon request by rostering engine C120, stanza router C110 or messaging engine C140, amongst other request sources. Inputs to presence engine C130 trigger presence updates also. Eg: a delivery receipt received by messaging engine C140, will result in a presence update notification being send over F8 to presence engine C130 for processing as above.

Messaging engine C140 routes messages to and from an instance of XMPP client C10. Messaging engine C140 may generate 'probes' (via stanza router C110) to decide whether to route a message into the XMPP environment (via stanza router C110), or to route it alternately via non-XMPP routes (via carrier interface C160) Messaging outcomes, in various forms including, but not limited to, SMS Delivery Receipts and Dual Tone Multi-Frequency (DTMF) tones, originating from carrier interface C160, trigger the transmission of updates over F8 to presence engine C130.

Pinger C150 takes requests from presence engine C130 and carries out proactive tests to determine the availability of an address as provided by presence engine C130 over F12. These tests include, but are not limited to, lookups over IP of external national Number Portability Databases, establishing IP session over USSD to end-user device.

Carrier interface C160 communicates to a non-XMPP client C40 over a number of protocols (F14), for example, Short Message Peer-to-Peer (SMPP), HTTP, Session Initiation Protocol (SIP), and other SMS-capable protocols in the case of SMS, Session Initiation Protocol/Time Division Multiplexing (SIP/TDM) in the case of voice termination, also additional message-capable protocols including but not limited to Simple Mail Transfer Protocol (SMTP), Post Office Protocol 3 (POP3), or Internet Message Access Protocol (IMAP).

Procedures

Figure 2:
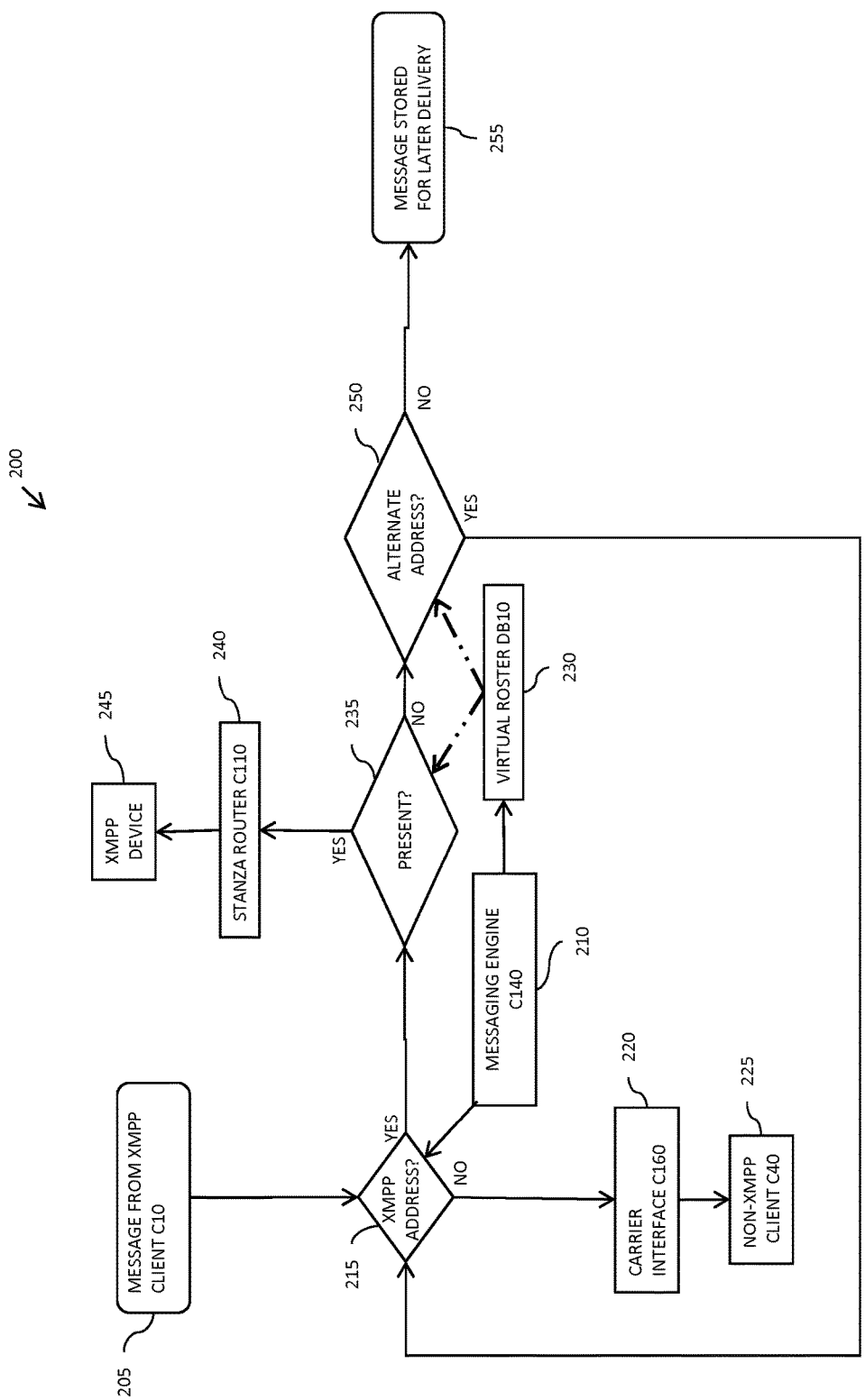
FIG. 2. A procedure for automatically routing a message to a non-XMPP device for a contact if an XMPP device address for that contact is unavailable.

FIG. 2 shows a procedure for automatically routing a message to a non-XMPP device for a contact if an XMPP device address for that contact is unavailable. A message from XMPP client C10 is received by system C100 as shown in block 205. The messaging engine C140 (block 210) determines if the message has an XMPP address as shown in block 215. If the address is not an XMPP address, the message is sent to the non-XMPP client C40 having the non XMPP address (block 225) through the carrier interface C160 (block 220). If the address is an XMPP address in block 215, the messaging engine C140 sends a query to the virtual roster DB10 (block 230) requesting presence information on the intended XMPP address as shown in block 235. If the query result returns a message indicating the intended XMPP address is available (or 'present'), the messaging engine C140 will route the message to the device 245 having the intended XMPP address via the stanza router C110 (block 240). In at least one embodiment, a determination of the presence information may be made using procedure 300, shown in FIG. 3 and described below.

If the query result returns a message indicating the intended address is flagged in the virtual roster DB10 (block 230) as 'not present', a subsequent call is made by the messaging engine C140 to the virtual roster DB10 seeking to find if an alternate address is recorded for the contact having the 'not present' XMPP address as shown in block 250. If an alternate address is returned that is a non-XMPP address, the messaging engine C140 re-addresses the message and routes it through the carrier interface C160 to the non-XMPP client C40. If no alternate address is returned, the message may be stored for later delivery as shown in block 255.

Figure 3:
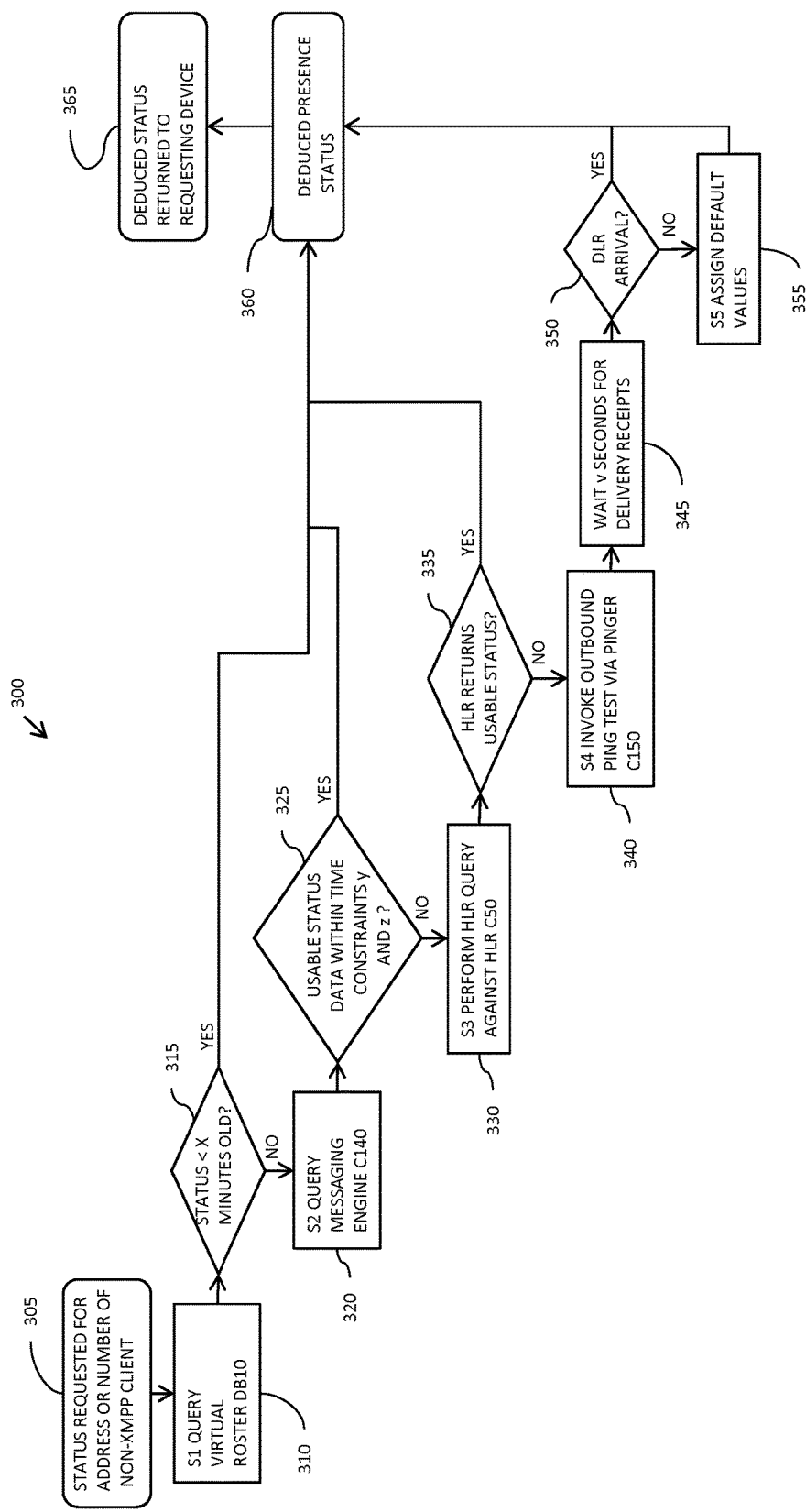
FIG. 3. A procedure for determining a presence status for a non-XMPP address.

FIG. 3 shows a procedure 300 for determining a presence status for a non-XMPP address. The procedure 300 may receive the non-XMPP address from XMPP client C10. The non-XMPP address may refer to, for example, an instance of non-XMPP client C40 as shown in block 305. Through a series of steps, procedure 300 may be used to deduce a presence status for this address, for example, a presence status of available, away (temporarily away), away/xa (extended away), or unavailable. In block 310, as part of operation S1, virtual roster DB10 is interrogated (SQL) for a presence status of non-XMPP client C40, and an associated timestamp for said status. If less than a certain time x (configurable) has elapsed since this status was set as shown in block 315, it is concluded that this retrieved presence status is valid and the presence status is passed on to block 360 as the deduced presence status. If no definitive findings result from operation S1, in block 320, as part of operation S2, the most recent message history is retrieved by an API call to messaging engine C140, to include delivery status and time of the most recent interactions between messaging engine C140 and the present instance of non-XMPP client C40. Using threshold values, y and z (configurable) the most recent delivery is checked as to whether it was a) successful, and b) within time period y, as shown in block 325. Inbound message data is also retrieved, availability being signaled by an inbound message from the present instance of non-XMPP client C40 within a time period z. If the message history indicates a successfully delivery to the non-XMPP client C40 within the prescribed time period y, or an inbound message from the non-XMPP client C40 within the prescribed time period z, a deduced presence status of "available" may be sent to block 360. If no definitive status has been arrived at, in block 330, operation S3 involves a synchronous query against HLR C50 for HLR data which may indicate availability of the non-XMPP client address. For example, rostering engine C120 may query HLR C50 which, in response can report a number as 'available', 'temporarily unavailable', or 'permanently unavailable' as shown in block 335. The 'available', 'temporarily unavailable', or 'permanently unavailable' status may be converted to the appropriate presence status ('available', 'away/xa', and 'unavailable' respectively) and the presence status sent to block 360 as the deduced presence status. If the HLR data does not include an indication of availability, the status remains unknown, and in block 340, operation S4 optionally sends a 'mute' message to non-XMPP client C40, in an attempt to trigger Delivery Receipt (DLR) activity which would indicate availability. S4 may also attempt to initiate a USSD session with the non-XMPP client C40, using the success or failure of this session initiation to decide availability. As shown in block 345, the procedure may wait for a time period v for delivery receipts. As shown in block 350, if one or more delivery receipts arrive within time period v, the status of the non-XMPP client may be deduced as "available" and passed on to block 360, otherwise, as shown in block 355, operation S5 sets the status to a configurable value 'default_status', for example, "unavailable" or "unknown," which is then passed on to block 360. Once the status of the non-XMPP has been deduced the status may be returned in a message to XMPP client C10, as shown in block 365.

Physical Presentation

The system C100 is modular in design, allowing for redundancy and scalability. All its constituent components (XMPP gateway component C30, stanza router C110, rostering engine C120 presence engine C130, messaging engine C140, pinger C150, carrier interface C160, virtual roster DB10, subscriber database DB20, validation rules DB30) can co-reside on a single linux/windows system, or each can run on single or multiple independent systems, all routing between functional units being over IP protocols.

Figure 4:
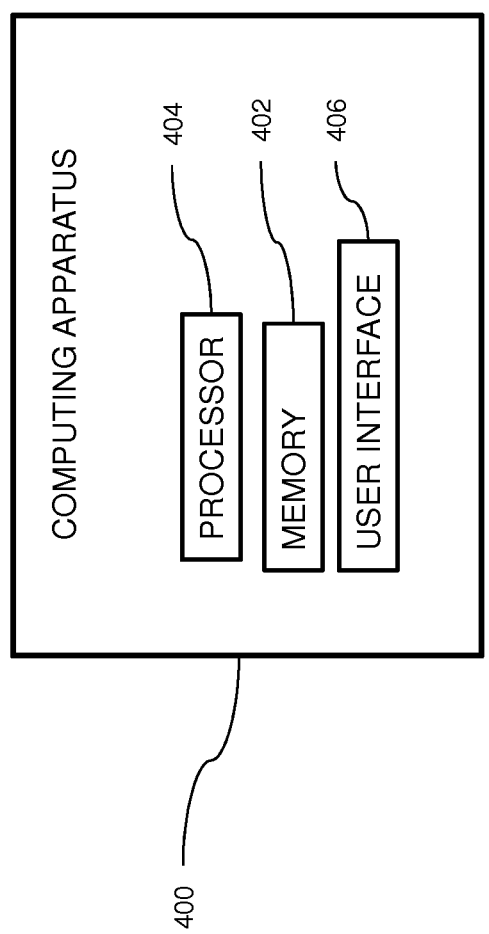
FIG. 4. A block diagram of a computing apparatus that may be used to practice aspects of the disclosed embodiments.

In at least one aspect of the disclosed embodiment, the techniques disclosed herein may be executed by one or more computers under the control of one or more programs stored on computer readable medium. FIG. 4 shows a block diagram of a computing apparatus 300 that may be used to practice aspects of the disclosed embodiments. In at least one exemplary aspect, XMPP gateway component C30, stanza router C110, rostering engine C120 presence engine C130, messaging engine C140, pinger C150, carrier interface C160, virtual roster DB10, subscriber database DB20, and validation rules DB30 and other disclosed devices and systems may be implemented using an instance or replica of the computing apparatus 300 or may be combined or distributed among any number of instances or replicas of computing apparatus 300. Procedures 200 and 300 as well as the System Processes described below may also be implemented or performed by one or more instances of the computing apparatus 300.

The apparatus 300 may include computer readable program code stored on at least one computer readable medium 302 for carrying out and executing the process steps described herein. The computer readable medium 302 may be a memory of the computing apparatus 300. In alternate aspects, the computer readable program code may be stored in a memory external to, or remote from, the apparatus 300. The memory may include magnetic media, semiconductor media, optical media, or any media which is readable and executable by a computer. Computing apparatus 300 may also include a microprocessor 304 for executing the computer readable program code stored on the at least one computer readable medium 302. In at least one aspect, computing apparatus may include one or more input or output devices, generally referred to as a user interface 306 which may operate to allow input to the computing apparatus 300 or to provide output from the computing apparatus 300, respectively.

System Processes

P210—SUBSCRIPTION: Initially, the XMPP client C10 adds the non-XMPP client C40 to a roster, located at XMPP Server C20. The system C100 provides an XMPP address for the non-XMPP client C40, for example, a cell number '1234567890' may be assigned an XMPP address or Jabber Identifier (JID) similar to '1234567890@component.testxmpp.com' allowing the XMPP client C10 to add the non-XMPP client C40 in this manner, as though it were a regular XMPP device. The XMPP client C10 sends a <presence/> stanza of type 'subscribe' to the non-XMPP client's assigned XMPP address, via XMPP server C20. This subscription stanza is received by the XMPP gateway component C30 which passes it over F3 to stanza router C110. Stanza router C110 passes subscription request via IP (F4) to rostering engine C120. Rostering engine C120 validates the target (non-XMPP client C40) address using internal rules and external sources, such as HLR lookup (IP over F16 to HLR C50) Internal rules, retrieved from validation rules DB30, provide for criteria such as correct territory-specific address format, number of characters. Once this validation is successful, the subscription is automatically accepted. Rostering engine C120 adds an entry to virtual roster DB10 which represents the mapping between the particular instance of XMPP client C10 and the particular instance of non-XMPP client C40. Rostering engine C120 then prompts stanza router C110, via API call 'send_subscribed', to return a <presence/> stanza of type 'subscribed', to XMPP server C20, addressed to XMPP client C10. To reciprocate the subscription request, stanza router C110 then sends an XMPP <presence/> stanza of type 'subscribe' to XMPP server C20, addressed to XMPP client C10, thus completing the mutual subscription process, and adding the device to the XMPP client C10 roster. If authentication or validation fail, rostering engine C120 then prompts stanza router C110, via API call 'send_subscribe_fail', to return a <presence/> stanza of type 'error' or 'unsubscribed', to XMPP server C20, addressed to XMPP client C10.

P220—UNSUBSCRIPTION: Wishing to remove a particular instance of non-XMPP client C40 from its roster, XMPP client C10 sends a <presence/> stanza of type 'unsubscribe' to the non-XMPP client's assigned XMPP address, via XMPP server C20. This stanza is received by the XMPP gateway component C30 which passes it over F3 to stanza router C110. Stanza router C110 passes unsubscription request via IP (F4) to rostering engine C120. Rostering engine C120 removes the entry from virtual roster DB10 which represents the mapping between the particular instance of XMPP client C10 and the particular instance of non-XMPP client C40. Rostering engine C120 then prompts stanza router C110, via API call 'send_unsubscribed', to return a <presence/> stanza of type 'unsubscribed', to XMPP server C20, addressed to XMPP client C10.

P230—MESSAGING: Instant Messages (IM) are relayed transparently by the system C100 between the XMPP client C10 and the non-XMPP client C40. Messages originating from XMPP client C10, as <message/> stanzas, are passed, via XMPP client C10, using XMPP (F1/F2) to XMPP gateway component C30. XMPP gateway component C30 passes the stanzas to rostering engine C210. The sender (XMPP client C10) is authenticated against entries from subscriber database DB20. Once authenticated, stanza router C110 parses the stanza, and makes a call 'send_message' to messaging engine C140, over IP, providing parameters including, but not limited to, 'from', 'to', 'payload', 'msg_type'. messaging engine C140 queries virtual roster DB10 for information on the specific instance of non-XMPP client C40 to which this message is addressed. If virtual roster DB10 contains an XMPP address entry (instance of XMPP client C10, call it C11) for this instance of non-XMPP client C40, messaging engine C140 then prompts stanza router C110, via API call 'send_probe', to transmit a <presence/> stanza of type 'probe', addressed to this new destinations address, C11. If this call returns a value of '100', the XMPP address for this instance of non-XMPP client C40 is used as the new message destination. Messaging engine C140 then prompts stanza router C110, via API call 'send_message', to transmit a <message/> stanza, to C11. Where virtual roster DB10 does not contain an XMPP address for this instance of non-XMPP client C40, messaging engine C140 queries subscriber database DB20 for the non-XMPP address to assign to the originating XMPP address (XMPP client C10) The message is re-formed with this mapped non-XMPP address (C41) set as the source address. The message is passed to carrier interface C160 for delivery to the end user. In the case of SMS, carrier interface C160 transmits the message via SMPP.HTTP, or other SMS-capable protocols, for delivery by the cell phone carrier, to the cell phone, non-XMPP client C40. In the case of voice messaging, Carrier interface C160, converts the text payload to audio using tts (text to speech) software. Carrier interface C160 relays the resulting audio message payload as a voice message over convention telephony networks (SIP/TDM etc.). The receiving device (non-XMPP client C40) sees the message as originating from C41, the mapped non-XMPP representation of XMPP client C10. The receiving device non-XMPP client C40 can then replay to this address (C41) and have this reply routed back to the originating XMPP client C10, using the reciprocal of the above described process.

P240—PRESENCE: The presence Engine C130 reports and sets the status for particular non-XMPP addresses. DLR data from carrier interface C160 is received and parsed by presence engine C130. Presence engine C130 maps learned information relating to message failure or success to presence information, and passes this via API call to rostering engine C120, which in turn updates the virtual roster DB10. If a delta, or status change has occurred, presence engine C130 retrieves all roster entries relating to the specific non-XMPP address (by API call to rostering engine C120) then, for each roster entry C1x, prompts stanza router C110, via API call 'send_presence', to return a <presence/> stanza of type 'available', 'away' or 'unavailable' as appropriate, to XMPP server C20, addressed to C1x. Changes to the presence status of the device can be event driven, as in, but not restricted to, the DLR example above, or as a result of C240 performing procedure 200.

P250—BULK ROSTER POPULATION: Rostering engine C120, upon receipt, over its API, of a contacts data stream, containing fields including, but not limited to Name, non-XMPP address, XMPP address for each required roster member, for the roster of XMPP client C10, will validate the non-XMPP addresses and map them to XMPP addresses (C4x), as per process P210. For each added roster member, rostering engine C120 then prompts stanza router C110, via API call 'send_subscribe', to transmit a <presence/> stanza of type 'subscribe', to XMPP server C20, addressed to XMPP client C10. XMPP client C10 accepts, either manually or automatically, the subscribe requests, then reciprocates with a <presence/> stanza of type 'subscribe' address to C4x. Upon receipt of this 'subscribe' stanza via stanza router C110, rostering engine C120 then prompts stanza router C110, via API call 'send_subscribed', to transmit a <presence/> stanza of type 'subscribed', to XMPP server C20, addressed to XMPP client C10.

The invention claimed is:

1. An Extensible Messaging and Presence Protocol (XMPP) presence system (C100), for pseudo-presence indication for non-Extensible Messaging and Presence Protocol (non-XMPP) client devices within XMPP application, comprising:
an XMPP gateway (C30) configured for receiving a message from an XMPP client (C10) for delivery to a contact (C40);
a presence engine (C130), arranged to determine XMPP and non-XMPP presence information of the contact (C40) and to report and set a status for a first non-XMPP address associated with said contact, based on collection, deduction or extrapolation of presence information harvested from at least one source,
a virtual roster (DB10), arranged to store the determined XMPP and non-XMPP presence information for the contact (C40),
a messaging engine (C140), arranged to route the message through the XMPP presence system (C100) and configured to query the virtual roster (DB10) for an XMPP address and presence information related to the contact (C40), the messaging engine (C140) further configured to query the virtual roster (DB10) for an alternative address comprising the first non-XMPP address when an XMPP address is not available as determined by the presence engine (C130), or when the presence information indicates that the contact (C40) is unavailable; and
a carrier interface (C160) configured to route the message via a non-XMPP route from the XMPP presence system (C100), and to deliver the message to the alternative address.

2. The system (C100) of claim 1, wherein the system (C100) further comprises a means for storing the message for future delivery if an alternate address is unavailable.

3. The system (C100) of claim 1, wherein the XMPP gateway (C30) is configured to send the message to the XMPP address if the XMPP address is available and the XMPP presence information indicates that the contact (C40) is available.

4. The system (C100) of claim 1, wherein the messaging engine (C140) is configured to query the virtual roster (DB10) for a presence indication related to the contact (C40) that meets certain time constraints.

5. The system (C100) of claim 1, wherein the presence engine (C130), or a rostering engine (C120) arranged cooperatively with the presence engine (C130), is configured to query delivery receipt DLR data or components associated with a telecommunications system related to the contact (C40), respectively, for a status of the contact (C40).

6. The system (C100) of claim 5, further comprising a pinger (C150) configured to send a non-XMPP message to the contact (C40) if the home location register (C50) query fails.

7. A method of indicating pseudo-presence for non-Extensible Messaging and Presence Protocol (non-XMPP) client devices within Extensible Messaging and Presence Protocol (XMPP) applications comprising:
receiving a message from an XMPP client (C10), via an XMPP gateway (C30) comprised in an XMPP presence system (C100), for delivery to a contact (C40);
determining, by means of a presence engine (C130) comprised in the XMPP presence system (C100), XMPP and non-XMPP presence information of the contact, the presence engine (C130) being further arranged for reporting and setting the status for a first non-XMPP address associated with said contact, based on collection, deduction or extrapolation of presence information harvested from at least one source,
querying, by means of a messaging engine (C140) arranged to route the message through the XMPP presence system (C100), a virtual roster (DB10) also comprised in the XMPP presence system (C100) and arranged to store the determined XMPP and non-XMPP presence information for the contact (C40), for an XMPP address and presence information related to the contact (C40), and for an alternative address comprising the first non-XMPP address when an XMPP address is not available as determined by the presence engine (C130), or when the presence information indicates that the contact (C40) is unavailable;
delivering the message to the alternative address by means of a carrier interface (C160) routing the message via a non-XMPP route from the XMPP presence system (C100).

8. The method of claim 7, comprising storing the message for future delivery if an alternate address is unavailable.

9. The method of claim 7, comprising sending the message to the XMPP address if the XMPP address is available and the XMPP presence information indicates that the contact (C40) is available.

10. The method of claim 7, wherein the querying comprises one or more of:
    querying the virtual roster (DB10) for presence information related to the contact that meets certain time constraints; or,
    querying, by means of the presence engine (C130), or a rostering engine (C120) arranged co-operatively with the presence engine (C130), delivery receipt DLR data or components associated with a telecommunications system related to the contact (C40), respectively, for a status of the contact (C40).

11. The method of claim 10, wherein querying components of a telecommunications system in which the XMPP presence system resides for a presence indication related to the contact comprises:
    sending a non-XMPP message to the contact by means of a pinger (C150) if the home location register query fails.

12. The method of claim 10, comprising:
    assigning a default presence indication if the telecommunications system query fails; and
    sending the default presence indication to the XMPP client (C10).

13. The method of claim 10, wherein querying the virtual roster (DB10) for a presence indication related to the contact (C40) that meets certain time constraints comprises:
    querying the virtual roster (DB10) for a presence status that was set within a certain time; and/or
    querying the messaging engine (C140) for delivery status of messages sent to the contact that meet a time threshold if the virtual roster (DB10) query fails.

14. A apparatus (400) comprising:
    a memory (402) with computer readable program code; and
    a processor (404), wherein the processor (404) with the memory (402) and computer readable program code are configured to cause the apparatus to implement the method according to claim 7.

15. The system (C100) of claim 5, the rostering engine (C120) being configured to query a home location register (C50) of the telecommunications system.

16. The method of claim 10, wherein the querying comprises querying a home location register (C50) of the telecommunications system by means of the rostering engine (C120) for a status of the contact (C40).

17. A method comprising:
    determining, by an Extensible Messaging and Presence Protocol (XMPP) presence system, XMPP and non-XMPP presence information of a contact, based on collection, deduction or extrapolation of presence information harvested from at least one source, in response to receipt of a message for the contact from an XMPP client at a gateway of the XMPP presence system, wherein the XMPP presence system is further arranged for reporting and setting the status for a first non-XMPP address associated with said contact;
    querying, by the XMPP presence system, a virtual roster, for an XMPP address and presence information related to the contact, wherein the virtual roster stores the determined presence XMPP and non-XMPP presence information for the contact;
    querying, by the XMPP system, the virtual roster for an alternate address comprising the first non-XMPP address when the XMPP address or when the presence information for the contact is unavailable; and
    delivering, from a carrier interface of the XMPP presence system, the message to the alternate address by routing the message via a non-XMPP route from the XMPP presence system.

18. A system comprising:
    a non-transitory memory having machine readable instructions;
    one or more processors that access the memory and executes the machine readable instructions, the machine readable instructions comprising an Extensible Messaging and Presence Protocol (XMPP) presence system, the XMPP presence system being configured to:
        query a virtual roster for presence information and an associated time stamp for a non-XMPP contact in response to receipt of a request for a presence status for the non-XMPP client, the request being provided from an XMPP client; and
        determine the presence status, based on collection, deduction or extrapolation of presence information harvested from at least one source, for the non-XMPP client contact in response to the time stamp associated with the presence information indicating that a predetermined amount of time has elapsed since a time identified in the timestamp, wherein the determining comprises:
        retrieving, from a messaging engine, a status and time of a most recent interaction between the messaging engine and the non-XMPP client.

19. The system of claim 18, wherein the XMPP presence system returns a presence status of available in response to the retrieved status indicating that a most recent delivery of a message to the non-XMPP client was successful and that the most recent delivery of the message occurred within a predetermined time period.

20. The system of claim 18, wherein the XMPP presence system returns a presence status of available in response to the retrieved status indicating that a most recent receipt of a message from the non-XMPP occurred within a predetermined time period.

21. The system of claim 18, wherein the determining further comprises:
    querying a home location register (HLR) for HLR data indicating an availability of the non-XMPP client in response to the retrieved status indicating that a most recent interaction with the non-XMPP client occurred after a predetermined time period elapsed.

22. The system of claim 21, wherein the determining further comprises:
    sending a message to the non-XMPP to trigger a Delivery Receipt (DLR) message from the non-XMPP, wherein the delivery receipt message indicates the availability of the non-XMPP client, in response to the HLR data indicating that the availability of the non-XMPP client is unknown.

23. The system (C100) of claim 1, further comprising a pinger (C150) configured to:
    take requests from the presence engine (C130); and
    determine an availability of an address provided by the presence engine (C130).

24. The method of claim 7, further comprising:
    taking, by means of a pinger (C150), requests from the presence engine (C130); and determining, by means of the pinger (C150), an availability of an address provided by the presence engine (C130).

25. The system (C100) of claim 23, wherein the pinger (C150) is configured to determine the availability of the address provided by the presence engine (C130) by carrying out proactive tests.

26. The method of claim 7, wherein the pinger (C150) determines the availability of the address provided by the presence engine (C130) by carrying out proactive tests.

27. The system (C100) of claim 1, wherein the messaging engine (C140) is configured to query the virtual roster (DB10) for the alternative address comprising the first non-XMPP address when the XMPP address is not available, regardless of the presence information.

28. The method of claim 7, wherein the virtual roster (DB10) is queried when the XMPP address is not available, regardless of the presence information.

\* \* \* \* \*